United States Patent
Lai et al.

(10) Patent No.: US 7,619,712 B2
(45) Date of Patent: Nov. 17, 2009

(54) POLARIZER-ALIGNMENT DUAL FUNCTION FILM, FABRICATION METHOD THEREOF AND LCD CONTAINING THE SAME

(75) Inventors: Yi-Ying Lai, Hsinchu (TW); Hui-Lung Kuo, Taipei (TW); Sheng-Wen Lin, Taipei County (TW); Pin-Chen Chen, Taipei (TW); Mei-Chih Peng, Taoyuan County (TW); Yi-Ping Hsieh, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 61 days.

(21) Appl. No.: 11/859,231

(22) Filed: Sep. 21, 2007

(65) Prior Publication Data

US 2008/0158499 A1    Jul. 3, 2008

(30) Foreign Application Priority Data

Dec. 29, 2006   (TW) .............................. 95149932 A

(51) Int. Cl.
*G02F 1/1333*    (2006.01)
*G02F 1/1335*    (2006.01)

(52) U.S. Cl. ........................................ 349/162; 349/96

(58) Field of Classification Search ................. 349/162, 349/96

See application file for complete search history.

(56) References Cited

U.S. PATENT DOCUMENTS

| | | | |
|---|---|---|---|
| 2,237,567 A | 4/1941 | Land | |
| 2,454,515 A | 11/1948 | Land | |
| 3,787,110 A * | 1/1974 | Berreman et al. | 349/123 |
| 4,241,984 A * | 12/1980 | Leibowitz | 349/162 |
| 6,977,699 B2 * | 12/2005 | Iijima | 349/114 |
| 2005/0225695 A1 * | 10/2005 | Arai et al. | 349/74 |
| 2007/0285616 A1 * | 12/2007 | Biver et al. | 351/177 |

FOREIGN PATENT DOCUMENTS

| | | |
|---|---|---|
| JP | 10-068820 | 3/1998 |
| JP | 2006-058517 | 3/2006 |

* cited by examiner

*Primary Examiner*—Charlie Peng
(74) *Attorney, Agent, or Firm*—Quintero Law Office

(57) ABSTRACT

A polarizer-alignment dual function film. The film comprising an optically anisotropic material layer having a plurality of strips integrally formed thereon. The strips provide an alignment function for aligning the liquid crystal molecules while the optically anisotropic material provides a polarization function such that the two functions can be integrated into a single-layered film.

21 Claims, 7 Drawing Sheets

POLARIZER-ALIGNMENT DUAL FUNCTION FILM, FABRICATION METHOD THEREOF AND LCD CONTAINING THE SAME

FIELD OF THE INVENTION

The invention relates to a polarizer-alignment dual function film, and more particularly to a polarizer-alignment dual function film used for a liquid crystal display.

DESCRIPTION OF THE RELATED ART

Recently, flat panel liquid crystal displays have been applied widely to various products such as personal computers, notebook computers, digital cameras, mobile phones, personal data assistants (PDA), liquid crystal televisions and the like. Referring to FIG. 6, it is a cross section of a conventional liquid crystal display comprising a pair of polarizers 103 and 104 respectively disposed on the outside of an upper substrate 101 and a lower substrate 102. A pair of alignment films 105 and 106 is disposed between the upper and lower substrates sandwiching a liquid crystal layer 110, such that the liquid crystal molecules therein are arranged in order.

The polarizer is an optical element for changing a natural light without polarization into a polarized light. The polarizer has wide applications such as those used in liquid crystal displays. The polarizer is a key component for display effect. Furthermore, the polarizer can be used for an optical lens, for example, a polarized-light filter of a camera or snow glasses, etc., which demonstrates wide application and economic benefits.

U.S. Pat. Nos. 2,237,567 and 2,454,515 disclose a conventional polarizer fabrication method. The method is performed by using an organic polymer material such as polyvinyl alcohol (PVA) or a derivative thereof to adsorb iodine and then stretch the polymer material along a single axis about 3 to 5 times its original length. Thereafter, the optically anisotropic components therein such as crystals containing iodine are arranged in order, thus the light into the polarizer with a specific electric field direction is absorbed to generate a polarized light. However, the conventional polarizer has poor resistance to environmental factors such as moisture and heat, preventing use from a high temperature and humid environment. Furthermore, the conventional polarizer also needs a protective film such as triacetate cellulose (TAC) film, and a suitable triacetate cellulose film is not easy to obtain. In addition, requirement for a precise stretching process also makes the conventional polarizer fabrication method inconvenient to fabricate the polarizer.

Another type of polarizer, a dye-type polarizer has better resistance to moisture and heat than the iodine contained polarizer, but it has disadvantages of a lower degree of polarization and being more susceptible to damage from UV light and mechanical friction. In addition, the dye-type polarizer is manufactured by many processes such as dipping, heating, precise stretching (numerous times) and adhesion, thus it is complicated and time-consuming.

For liquid crystal display fabrication, the liquid crystal molecules need to arrange in order. A conventional liquid crystal alignment technology is the rubbing process. However, the rubbing process induces dust, static charge, and rubbing defect, which are difficult to overcome. In addition, the conventional material used for alignment film is polyimide which can be formed from polyamic acid and soluble polyimide. During a long period of baking process with a high temperature, polyamic acid decomposes into smaller molecules easily while storage. On the other hand, polyimide is a cured polymer, thus it is hard to dissolve in a general organic solvent and to be coated on a substrate. Also, polyimide does not synthesize easily. Therefore, the conventional alignment film fabrication method has many problems to overcome.

A single optical film cannot satisfy all requirements of optical characteristics for the liquid crystal display, thus various optical films are needed to be combined. The conventional liquid crystal display needs to be disposed or coated with various films such as the polarizer and the alignment film on the substrate. Those films require to be fabricated in separate facilities, and then be assembled into the display by a plurality of processes.

Therefore, a single-layered film with various integrated functions to substitute for using various films in the conventional liquid crystal display fabrication is desired.

BRIEF SUMMARY OF THE INVENTION

The invention provides a polarizer-alignment dual function film comprising an optically anisotropic material layer having a plurality of strips integrally formed thereon, wherein the material of the optically anisotropic material layer is a composition, comprising (a) 97.5 to 50% by weight of a liquid crystal, and (b) 50 to 0.1% by weight of an optically dichroic material.

The invention further provides a method of fabricating a polarizer-alignment dual function film. The method comprises providing a substrate and coating an optically anisotropic material on the substrate to form an optically anisotropic material layer. A mold having a plurality of strips thereon is provided to perform an impression process on the optically anisotropic material layer. The mold is removed to form a plurality of strips on the optically anisotropic material layer, thus providing the polarizer-alignment dual function film. The optically anisotropic material coated on the substrate to form an optically anisotropic material layer is a composition comprising (a) 80 to 5% by weight of a liquid crystal and an optically dichroic material, (b) 2 to 0.01% by weight of a crosslinking agent, and (c) 94.5 to 18% by weight of a solvent.

In addition, the invention provides a liquid crystal display comprising a first substrate and a second substrate disposed opposite to the first substrate. A pair of polarizer-alignment dual function films (as described above) which is disposed on the first substrate and the second substrate respectively, such that the strips of the polarizer-alignment dual function films face each other. In addition, liquid crystal is injected between the pair of polarizer-alignment dual function films.

The invention further provides a liquid crystal display comprising a first substrate and a second substrate disposed opposite to the first substrate. An alignment film is disposed on the first substrate. A polarizer is disposed on the first substrate opposite to the alignment film. A polarizer-alignment dual function film (as described above) is disposed on the second substrate with the strips of the polarizer-alignment dual function film facing the alignment film. In addition, liquid crystal is injected between the polarizer-alignment dual function film and the alignment film.

A detailed description is given in the following embodiments with reference to the accompanying drawings.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. The description is provided for illustrating the general principles of the invention and is not meant to be limiting. The scope of the invention is best determined by reference to the appended claims.

The invention integrates a polarization function and an alignment function into a single-layered film. The polarizer-alignment dual function film has a plurality of strips integrally formed thereon, and the strips form a plurality of liquid crystal molecules arranged in order. Furthermore, the polarizer-alignment dual function film can be formed from an optically anisotropic material such that the light at different directions of the polarizer-alignment dual function film has different light adsorbing effect to produce a polarization effect.

Figure 3:
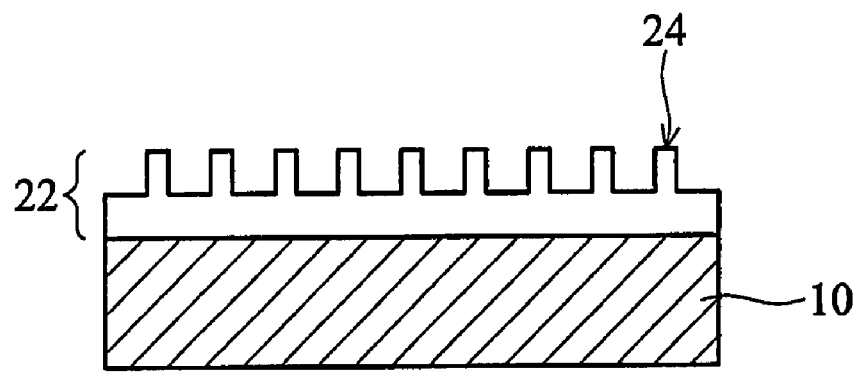

In one embodiment of the invention, a cross section of the polarizer-alignment dual function film is shown as FIG. 3. An optically anisotropic material layer 22 is disposed on a substrate 10. The substrate 10 may be a transparent substrate. The material of the optically anisotropic material layer 22 may be a composition, comprising: (a) 97.5 to 50% by weight of a liquid crystal, and (b) 50 to 0.1% by weight of an optically dichroic material. The preferred composition comprises (a) 96.5 to 90% by weight of a liquid crystal, and (b) 10 to 1% by weight of an optically dichroic material, and the more preferred composition comprises (a) 95.5 to 90% by weight of a liquid crystal, and (b) 10 to 2% by weight of an optically dichroic material. The surface of the optically anisotropic material layer 22 has a plurality of strips 24 to provide the polarizer-alignment dual function film of the invention.

Figure 1:
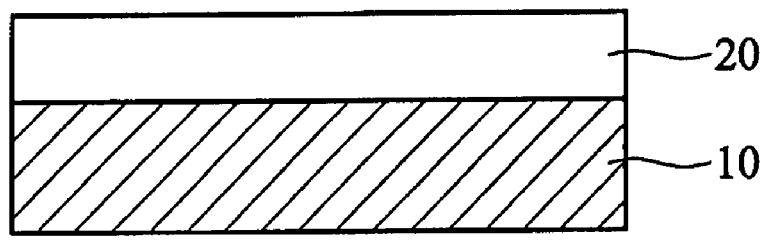
FIGS. 1-3 show cross sections of fabrication processes of a polarizer-alignment dual function film of one embodiment of the invention.
Figure 2:
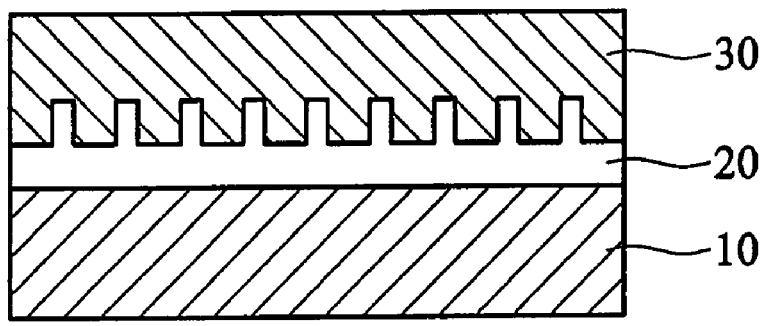

In one embodiment of the invention, a method of fabricating the polarizer-alignment dual function film is shown as FIGS. 1-3. Referring to FIG. 1, first, an optically anisotropic material solution is coated on the substrate 10. The coating method may be spin coating, blade coating or die coating, etc. The substrate 10 may be a transparent substrate formed from glass, transparent polymer or hybrids of organic polymer and inorganic particles, and an ITO electrode may be coated on the substrate.

The optically anisotropic material solution may be a composition, comprising: (a) 80 to 5% by weight of a solid, comprising a liquid crystal and an optically dichroic material, (b) 2 to 0.01% by weight of a crosslinking agent, and (c) 94.5 to 18% by weight of a solvent. The preferred composition comprises (a) 60 to 10% by weight of a solid, comprising a liquid crystal and an optically dichroic material, (b) 2 to 0.05% by weight of a crosslinking agent, and (c) 89.5 to 38% by weight of a solvent, and the more preferred composition comprises (a) 50 to 15% by weight of a solid, comprising a liquid crystal and an optically dichroic material, (b) 2 to 0.05% by weight of a crosslinking agent, and (c) 84.5 to 48% by weight of a solvent.

The liquid crystal may be a nematic liquid crystal, and all compositions or parts of the compositions thereof have a crosslinking characteristic. The optically dichroic material may be dichroic dyes, metal nanoparticles, carbon nanotubes, high-refractive-index pillared particles or high-refractive-index acicular particles, wherein the metal nanoparticle and carbon nanotube have a length of 10 to 200 nm. The high-refractive-index pillared or the high-refractive-index acicular particle has a refractive index of 1.5 to 2 and a size of 0.1 to 5 μm. Suitable organic solvents or combinations thereof are dependent on the liquid crystal and the optically dichroic material, and preferred solvents are toluene, xylene or ketone having a ring structure.

The optically anisotropic material may further comprises 0 to 5% by weight of a polymer, a polymer precursor, a network polymer precursor or combinations thereof, wherein the polymer may be epoxy resin or acrylic resin. The polymer precursor is methyl propyl acid ester or propyl acid ester. The network polymer precursor is for example SLM 90519 (product of Wacker Silicone), NOA65 or NOA81 (product of Norland Products inc.), methyl propyl acid ester containing multi-functional groups or propyl acid ester containing multi-functional groups. The above polymers or combinations thereof can mix with the liquid crystal to enhance polymerization of the optically anisotropic material. The crosslinking agent is such as I369 or I907 (product of Ciba) which help to form a network polymer.

Figure 5:
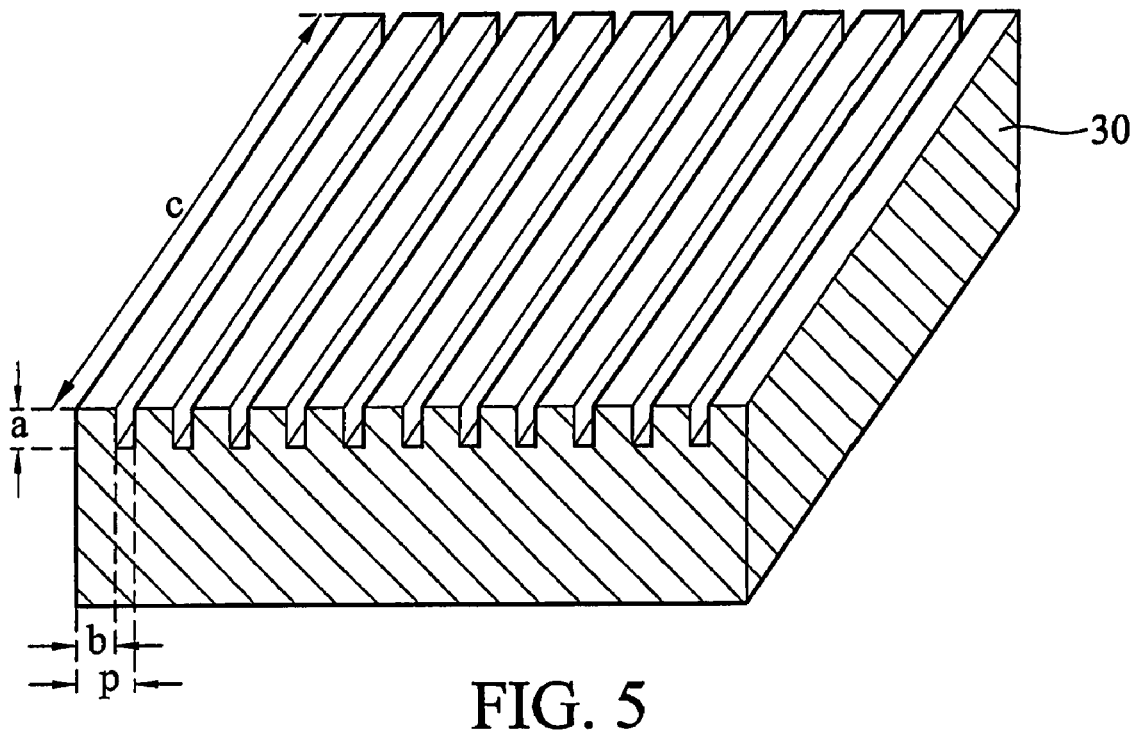
FIG. 5 shows a stereogram of a mold for a polarizer-alignment dual function film of one embodiment of the invention.

Then, the optically anisotropic material is baked to remove solvent, forming an optically anisotropic material layer 20 having a flat surface. Referring to FIG. 2, the optically anisotropic material layer 20 is subjected to an imprinting process by a mold 30 having a plurality of strips arranged in a periodic distance thereon. Referring to FIG. 5, it is a stereogram of the mold 30. The height (symbolized by a) of the strip on the mold 30 is about 0.1 to 2.5 μm, and the width (symbolized by b) of the strip is about 0.025 to 10 μm. The strips on the mold have a pitch (symbolized by p) of about 0.05 to 15 μm. The length (symbolized by c) of the strips can be adjusted depending on the sizes of the mold and the imprinting machine, and a ratio between a width of the strips to a width of a valley between the strips is about 0.2 to 5. The mold may be a flat-, an arc- or a roller-type. The optically anisotropic material layer 20 can be molded by the mold 30 combined with hot embossing, UV curing or combinations thereof to form a periodic pattern thereon. The periodic pattern on the optically anisotropic material layer 20 is complementary to the pattern of the mold 30. The pressure of hot embossing is about 3 to 30 psi, and the temperature thereof is dependent on the optically anisotropic material. If the optically anisotropic material is liquid crystal, the temperature of the hot embossing will be lower than the temperature of its isotropic state. The time of the hot embossing is about 1 to 20 minutes.

The optically anisotropic material can be cured by hot embossing, UV curing or combinations thereof, which is dependent on the polymer-type in the optically anisotropic material. For example, the optically anisotropic material containing a thermosetting polymer can be cured by hot embossing. The optically anisotropic material containing a light curing polymer can be cured by UV curing. The optically anisotropic material containing thermosetting and light curing polymers can be cured by a combination of hot embossing and UV curing.

Finally, referring to FIG. 3, the mold 30 is removed to provide the polarizer-alignment dual function film 22. The polarizer-alignment dual function film 22 has a plurality of strips 24 arranged into a periodic pattern thereon, and the periodic pattern is complementary to the pattern of the mold 30.

Figure 4:
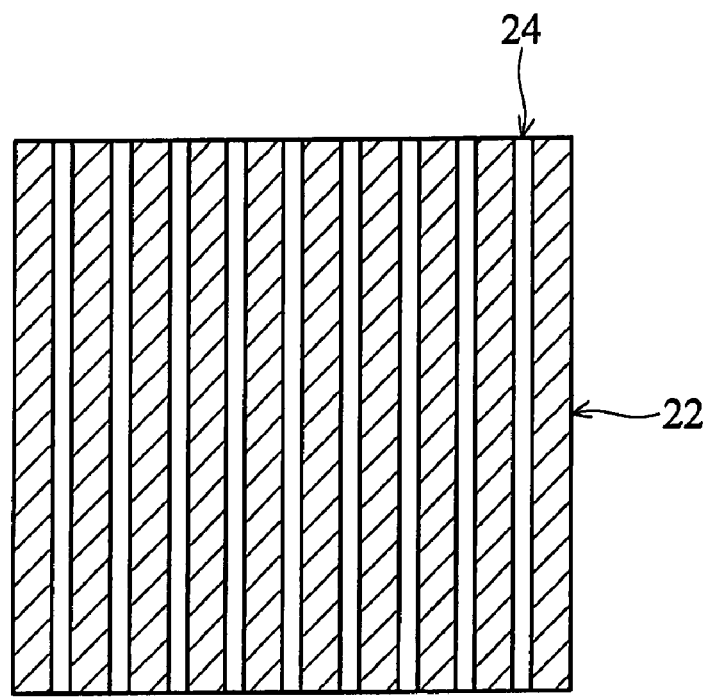
FIG. 4 shows a top view of a polarizer-alignment dual function film of one embodiment of the invention.

Referring to FIG. 4, it is a plane view of the polarizer-alignment dual function film 22 having a plurality of strips 24 thereon. In the polarizer-alignment dual function film 22, the optically anisotropic material layer containing the strips thereon has a thickness of about 0.1 to 5 μm. The strips 24 have a height of about 0.1 to 2.5 μm, a width of about 0.025 to 10 μm, a pitch of about 0.05 to 15 μm, and a ratio between a width of the strips to the width of a valley between the strips is about 0.2 to 5.

Figure 7A:
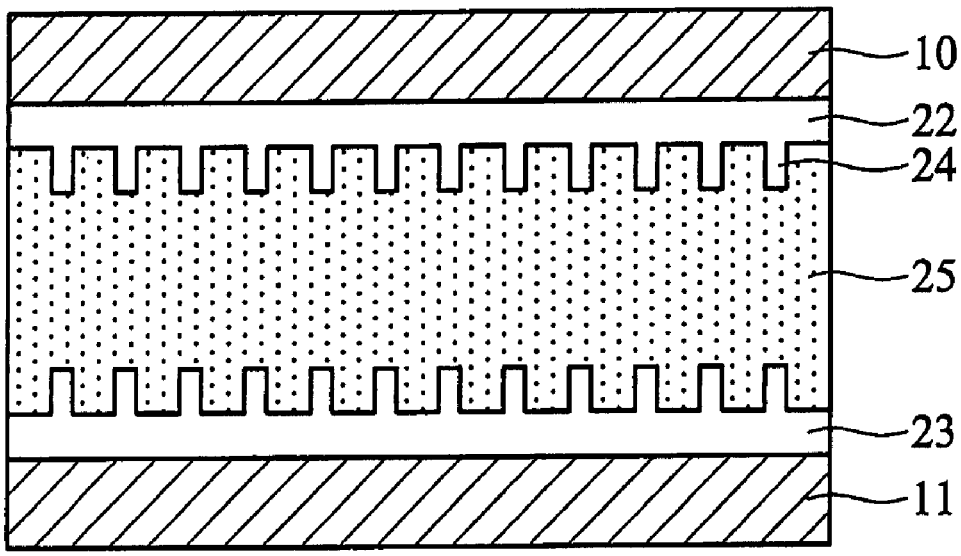
FIG. 7A shows a cross section of a liquid crystal display of a first embodiment of the invention, wherein the strips of a pair of polarizer-alignment dual function films are parallel to each other.
Figure 7B:
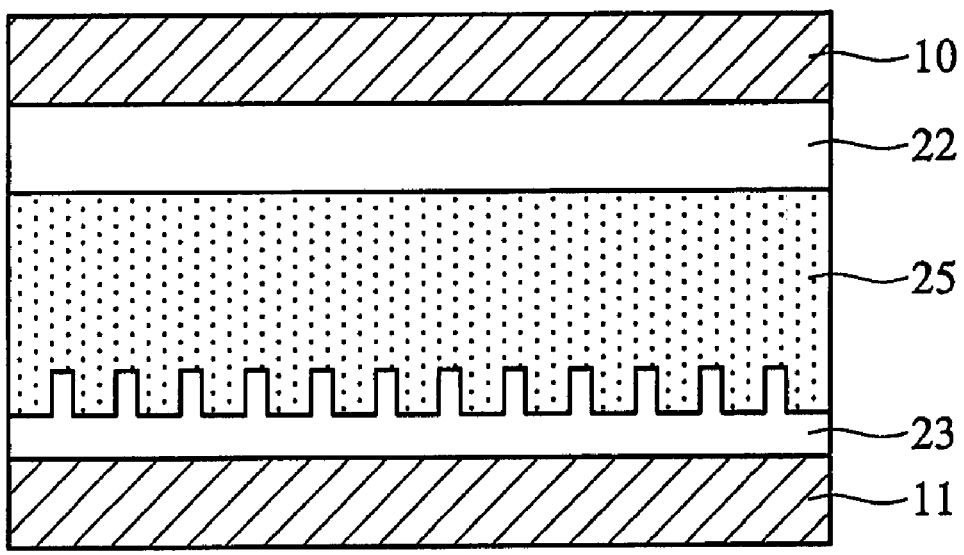
FIG. 7B shows a cross section of a liquid crystal display of a second embodiment of the invention, wherein the strips of a pair of polarizer-alignment dual function films are perpendicular to each other.

Referring to FIGS. 7A and 7B, which are cross sections of a liquid crystal display of embodiments of the invention. The liquid crystal display comprises a pair of polarizer-alignment dual function films 22 and 23 of embodiments of the invention disposed on an upper substrate 10 and a lower substrate 11 respectively, such that the strips 24 of the polarizer-alignment dual function films 22 and 23 face each other. A liquid crystal layer 25 is interposed between the pair of polarizer-alignment dual function films 22 and 23. The upper and lower substrates 10 and 11 may be transparent substrates having driving electrodes such as passive electrodes thereon. One of the upper and lower substrates may be a substrate having a color filter or a common electrode thereon, and the other substrate may be a substrate having a TFT array electrode thereon.

Referring to FIG. 7A, the strips 24 of the upper polarizer-alignment dual function film 22 can be parallel to the strips 24 of the lower polarizer-alignment dual function film 23. Meanwhile, referring to FIG. 7B, the strips 24 of the upper polarizer-alignment dual function film 22 can also be perpendicular to the strips 24 of the lower polarizer-alignment dual function film 23. The strips of the upper and the lower polarizer-alignment dual function films are disposed dependant on the types of the liquid crystal molecules. For example, when the liquid crystal molecules are nematic liquid crystal, the strips 24 of the upper polarizer-alignment dual function film 22 can be perpendicular to the strips 24 of the lower polarizer-alignment dual function film 23.

Figure 8:
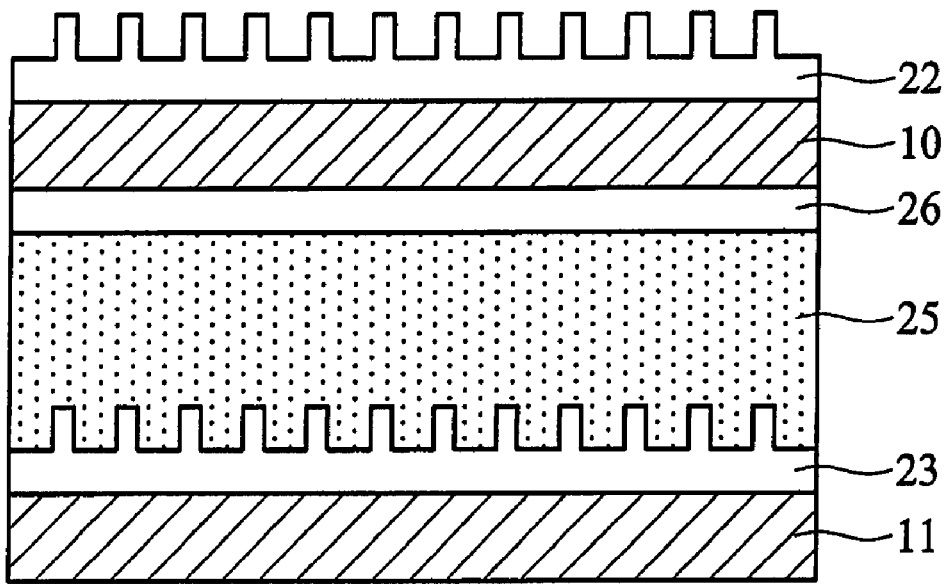
FIG. 8 shows a cross section of a liquid crystal display of a third embodiment of the invention.

Referring to FIG. 8, it is a cross section of a liquid crystal display of another embodiment of the invention. A pair of polarizer-alignment dual function films 22 and 23 (as described above) are disposed on an upper and a lower substrate 10 and 11 respectively. An alignment film 26 is disposed on the upper substrate 10 opposite to the polarizer-alignment dual function film 22. The strips 24 of the upper polarizer-alignment dual function film 22 are disposed on the outside of the upper substrate 10 and opposite to the alignment film 26. The polarizer-alignment dual function film 23 is disposed on the lower substrate 11 with the strips thereof facing the alignment film 26, and a liquid crystal layer 25 is interposed between the polarizer-alignment dual function film 23 and the alignment film 26. The upper and the lower substrates may be transparent substrates and have driving electrodes such as passive electrodes thereon. One of the upper and lower substrates may be a substrate having a color filter or a common electrode thereon, and the other substrate may be a substrate having a TFT array electrode thereon.

For the liquid crystal display in FIG. 8, the polarizer-alignment dual function film 22 on the upper substrate 10 is used as a polarizer, thus the alignment film 26 is required to be disposed on the upper substrate 10 for the liquid crystal alignment.

Figure 9:
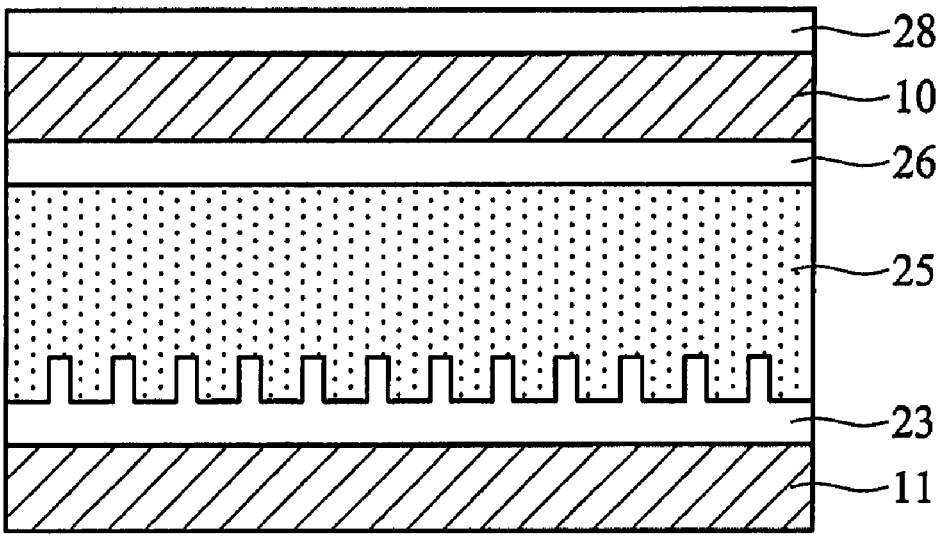
FIG. 9 shows a cross section of a liquid crystal display of a fourth embodiment of the invention.

Referring to FIG. 9, it is a cross section of a liquid crystal display of another embodiment of the invention, which comprises a pair of substrates 10 and 11. An alignment film 26 is disposed on the upper substrate 10. The polarizer-alignment dual function film 23 of one embodiment of the invention is disposed on the lower substrate 11 with the strips thereof facing the alignment film 26. A liquid crystal layer 25 is interposed between the polarizer-alignment dual function film 23 and the alignment film 26. The liquid crystal display further comprises a polarizer 28 disposed on the upper substrate 10 opposite to the alignment film 26. The upper and the lower substrates may be transparent substrates and have driving electrodes such as passive electrodes thereon. One of the upper and lower substrates may be a substrate having a color filter or a common electrode thereon, and the other substrate may be a substrate having a TFT array electrode thereon. For the liquid crystal display in FIG. 9, only the lower substrate 11 has the polarizer-alignment dual function film 23 thereon, thus the alignment film 26 and the polarizer 28 require disposition on the upper substrate 10 for providing liquid crystal alignment and polarization respectively.

Figure 6:
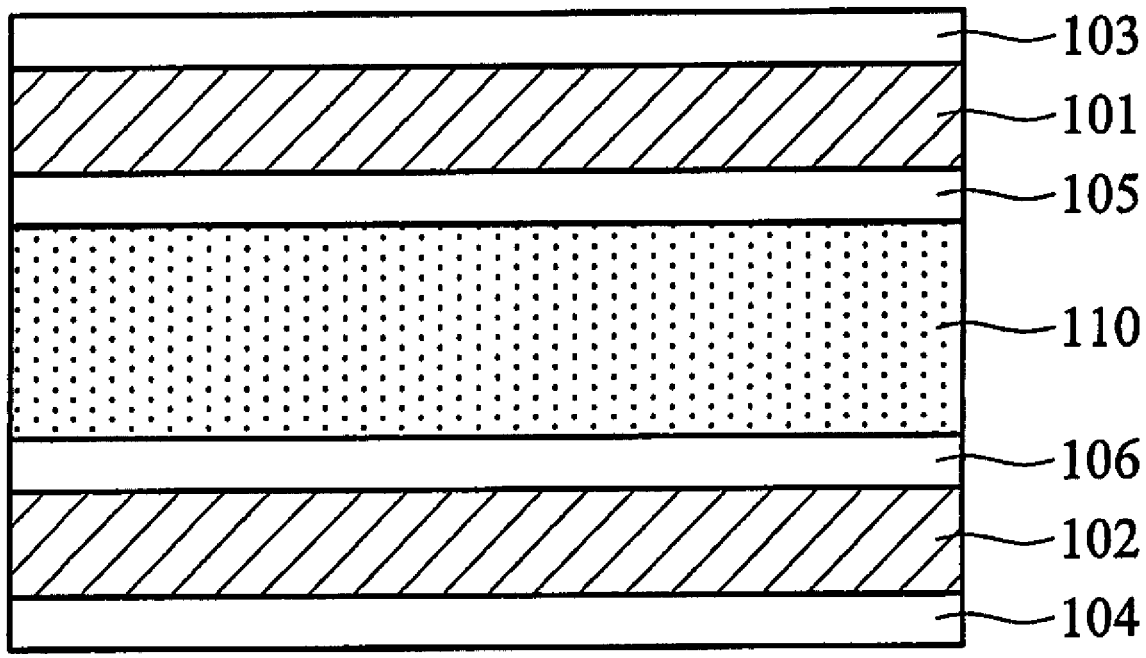
FIG. 6 shows a cross section of a conventional liquid crystal display.

The polarizer-alignment dual function film has an alignment function and a polarization function integrated into a single-layered film, such that the liquid crystal display does not need individual polarizers 103, 104 and alignment films 105, 106 of the conventional liquid crystal display (as shown in FIG. 6). The polarizer-alignment dual function film functions as the polarizer and the alignment film of the conventional liquid crystal display, and integrates the liquid crystal display into a simple structure. Therefore, the thickness and the layers of the liquid crystal display containing the polarizer-alignment dual function film can be reduced.

In addition, the polarizer-alignment dual function film is disposed on the inside of the liquid crystal display, such that it can prevent the problem of the polarizer adhering to the outside for conventional liquid crystal displays. The liquid crystal display containing the polarizer-alignment dual function film also has advantages of enhancing the contrast ratio and view angle of the liquid crystal display. Furthermore, the strips of the polarizer-alignment dual function film are formed by nano-imprinting process to provide the alignment function. Thus, it can eliminate problems such as static charge and dust for conventional alignment film formed by a rubbing process.

EXAMPLE 1

Fabrication of the Polarizer-Alignment Dual Function Film 29.47% by weight of a nematic liquid crystal, 1.47% by weight of a dichroic dye, 0.3% by weight of a network polymer precursor of SLM 90519, and 68.76% by weight of a solvent of toluene were mixed. The mixed solution was coated on a glass substrate having an ITO electrode thereon by spin coating. After baking to remove the solvent, an optically anisotropic material layer was obtained. Then, the optically anisotropic material layer was placed in an imprinting machine to performing an imprinting process with a mold having a plurality of strips thereon. The strips of the mold had a pitch of 1.8 μm and a height of 0.2 μm. The optically anisotropic material layer had a width of 3 cm and a length of 4 cm. The pressure of the imprinting process was about 1.5 bar, the temperature was about 100° C., and the time was about 20 minutes. After imprinting, the optically anisotropic material layer was subjected to UV curing. Then, the mold was removed to form a plurality of strips on the optically anisotropic material layer, thus providing the polarizer-alignment dual function film of Example 1. The thickness of the polarizer-alignment dual function film of Example 1 was about 3 μm. The polarizer-alignment dual function film of Example 1 was measured by a spectrometer (Lambda 900, product of PerkinElmer) and a polarization measuring element, and the result of measurement was shown as FIG. 10. The degree of polarization of the polarizer-alignment dual function film of Example 1 at a wavelength of 550 nm was 97.78% and the average transmission thereof was 14.75%.

EXAMPLES 2-7

Fabrication of the Polarizer-Alignment Dual Function Films

The molds used for the polarizer-alignment dual function film of Examples 2-7 were 3 μm, 10 μm, 250 nm, 574 nm, 697 nm and 804 nm respectively. The other process parameters and the materials of Examples 2-7 were the same as Example 1. The degree of polarization and the average transmission of the polarizer-alignment dual function films of Examples 2-7 were measured by the same way as Example 1, and the results thereof were shown in Table 1.

TABLE 1 the degree of polarization and the average transmission of the polarizer-alignment dual function films as described in Examples 1-7

| | pitch of the mold | degree of polarization (%) | average transmission (%) |
|---|---|---|---|
| Example 1 | 1.8 μm | 97.78 | 14.75 |
| Example 2 | 3 μm | 81.1 | 17.75 |
| Example 3 | 10 μm | 66.1 | 28.67 |
| Example 4 | 250 nm | 95.02 | 20 |
| Example 5 | 574 nm | 67 | 35.27 |
| Example 6 | 697 nm | 56.46 | 39.25 |
| Example 7 | 804 nm | 59.65 | 37 |

EXAMPLE 8

The Liquid Crystal Cell

Two polarizer-alignment dual function films of Example 1 on the transparent substrates were encapsulated into a liquid crystal cell, wherein the strips of one polarizer-alignment dual function film were perpendicular to the strips of the other polarizer-alignment dual function film. Then, nematic liquid crystal, MLC-13900-100 (product of Merck) was injected into the liquid crystal cell, and the liquid crystal cell was driven by a voltage of 0 to 12 volts. The transmission of the liquid crystal cell driven at different voltages was measured by a red diode He—Ne laser (633 nm), and the result was shown in FIG. 11. The contrast ratio of the liquid crystal cell of Example 8 was 19:1.

Figure 10:
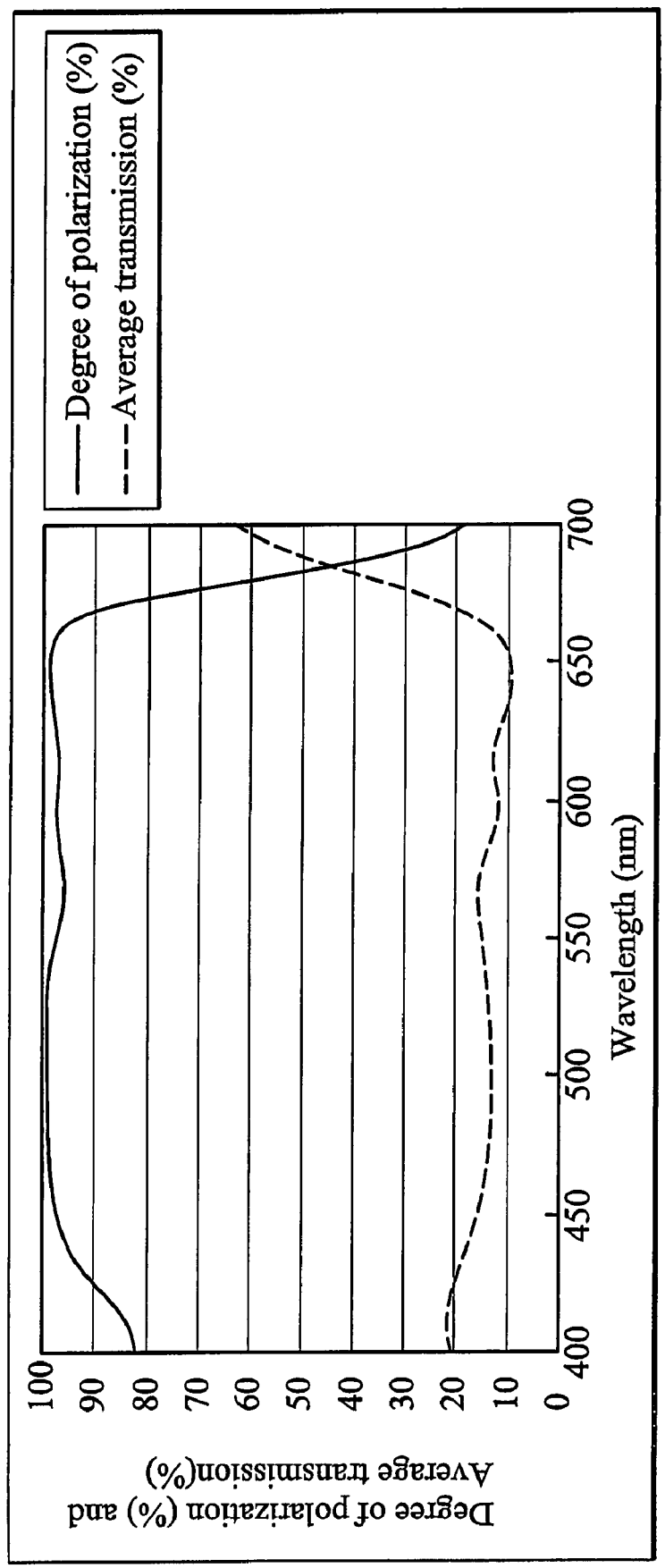
FIG. 10 shows degree of polarization and average transmission of a polarizer-alignment dual function film of Example 1 of the invention.
Figure 11:
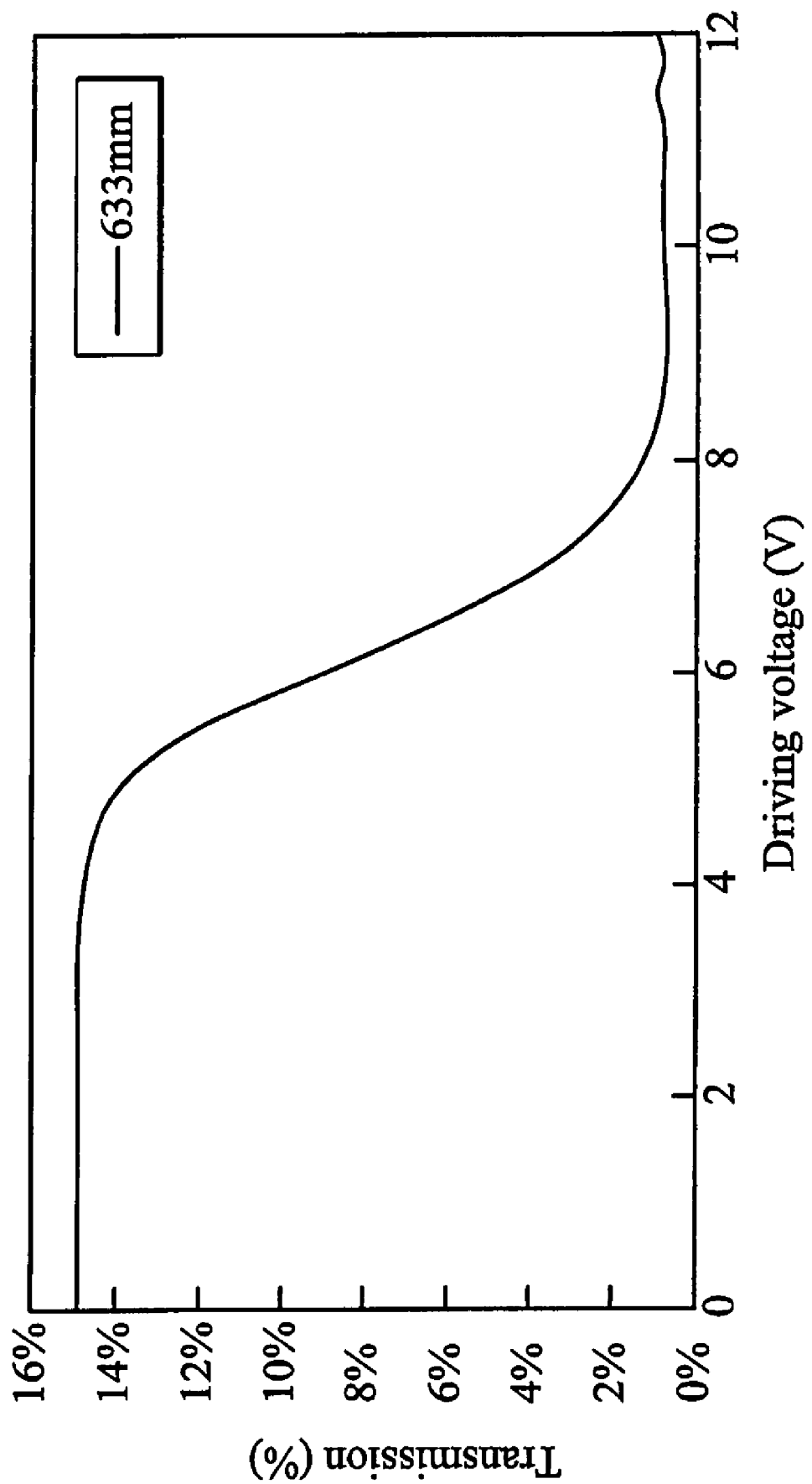
FIG. 11 shows applied voltage versus transmission of a liquid crystal display of Example 8 of the invention.

As shown in FIGS. 10 and 11, the degree of polarization and the average transmission of the polarizer-alignment dual function film of one embodiment of the invention satisfied polarizer requirements of liquid crystal displays. Furthermore, the polarizer-alignment dual function film of one embodiment of the invention can replace the polarizers and the alignment films of the conventional liquid crystal display, satisfying contrast requirements for liquid crystal displays.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A polarizer-alignment dual function film, comprising:
an optically anisotropic material single layer having a plurality of strips integrally formed thereon, wherein the plurality of strips is directly contacted with a liquid crystal layer, and
wherein the optically anisotropic material is a composition, comprising:
(a) 97.5 to 50% by weight of a liquid crystal; and
(b) 50 to 0.1% by weight of an optically dichroic material.

2. The polarizer-alignment dual function film as claimed in claim 1, wherein the strips have a height of 0.1 to 2.5 μm.

3. The polarizer-alignment dual function film as claimed in claim 1, wherein the strips have a pitch of 0.1 to 15 μm.

4. The polarizer-alignment dual function film as claimed in claim 1, wherein a ratio between a width of the strips to a width of a valley between the strips is 0.2 to 5.

5. The polarizer-alignment dual function film as claimed in claim 1, wherein the optically dichroic material comprises dichroic dye, metal nanoparticle, carbon nanotube, high-refractive-index pillared particle or high-refractive-index acicular particle.

6. The polarizer-alignment dual function film as claimed in claim 5, wherein the high-refractive-index pillared particle or the high-refractive-index acicular particle has a refractive index of 2 to 1.5.

7. A liquid crystal display, comprising:
a first substrate;
a second substrate disposed opposite to the first substrate;
a pair of polarizer-alignment dual function films disposed on the first substrate and the second substrate respectively, such that the strips of the polarizer-alignment dual function films face each other; and
a liquid crystal layer interposed between the pair of polarizer-alignment dual function films, wherein each polarizer-alignment dual function film comprises:
an optically anisotropic material layer having a plurality of strips integrally formed thereon,
wherein the optically anisotropic material is a composition, comprising:
(a) 97.5 to 50% by weight of a liquid crystal; and
(b) 50 to 0.1% by weight of an optically dichroic material.

8. The liquid crystal display as claimed in claim 7, wherein the first and the second substrates are transparent substrates.

9. The liquid crystal display as claimed in claim 7, wherein the first and the second substrates have driving electrodes thereon.

10. The liquid crystal display as claimed in claim 7, wherein the first or the second substrate comprises a substrate having a color filter or a common electrode thereon.

11. The liquid crystal display as claimed in claim 7, wherein the first or the second substrate has a TFT array electrode thereon.

12. The liquid crystal display as claimed in claim 7, wherein the first and the second substrates have passive electrodes thereon.

13. The liquid crystal display as claimed in claim 7, wherein the strips of the polarizer-alignment dual function film on the first substrate are perpendicular to that on the second substrate.

14. The liquid crystal display as claimed in claim 7, wherein the strips of the polarizer-alignment dual function film on the first substrate are parallel to that on the second substrate.

15. A liquid crystal display, comprising:
a first substrate;
a second substrate disposed opposite to the first substrate;
an alignment film disposed on the first substrate;
a polarizer disposed on the first substrate opposite to the alignment film;
a polarizer-alignment dual function film as claimed in claim 1 disposed on the second substrate with the strips of the polarizer-alignment dual function film facing the alignment film; and
a liquid crystal layer interposed between the polarizer-alignment dual function film and the alignment film, wherein the polarizer-alignment dual function film comprises:
an optically anisotropic material layer having a plurality of strips integrally formed thereon,
wherein the optically anisotropic material is a composition, comprising:
(a) 97.5 to 50% by weight of a liquid crystal; and
(b) 50 to 0.1% by weight of an optically dichroic material.

16. The liquid crystal display as claimed in claim 15, wherein the first and the second substrates are transparent substrates.

17. The liquid crystal display as claimed in claim 15, wherein the first and the second substrates have driving electrodes thereon.

18. The liquid crystal display as claimed in claim 15, wherein the first or the second substrate comprises a substrate having a color filter or a common electrode thereon.

19. The liquid crystal display as claimed in claim 15, wherein the first or the second substrates has a TFT array electrode thereon.

20. The liquid crystal display as claimed in claim 15, wherein the first and the second substrates have passive electrodes thereon.

21. The liquid crystal display as claimed in claim 15, wherein the polarizer is a polarizer-alignment dual function film, comprising:
an optically anisotropic material layer having a plurality of strips integrally formed thereon,
wherein the optically anisotropic material is a composition, comprising:
(a) 97.5 to 50% by weight of a liquid crystal; and
(b) 50 to 0.1% by weight of an optically dichroic material.

* * * * *